BINARY IMAGE PROCESSOR

Filed June 22, 1970 4 Sheets-Sheet 1

INVENTOR
STEPHEN B. GRAY
BY
Kenway, Jenney & Hildreth
ATTORNEYS

Dec. 12, 1972 S. B. GRAY 3,706,071

BINARY IMAGE PROCESSOR

Filed June 22, 1970 4 Sheets-Sheet 2

INVENTOR
STEPHEN B. GRAY
BY
Kenway, Jenney & Hildreth
ATTORNEYS

Dec. 12, 1972 S. B. GRAY 3,706,071

BINARY IMAGE PROCESSOR

Filed June 22, 1970 4 Sheets-Sheet 3

INVENTOR
STEPHEN B. GRAY
BY
Kenway, Jenney & Hildreth
ATTORNEYS

Dec. 12, 1972 S. B. GRAY 3,706,071

BINARY IMAGE PROCESSOR

Filed June 22, 1970 4 Sheets-Sheet 4

INVENTOR
STEPHEN B. GRAY
BY
Kenway, Jenney & Hildreth
ATTORNEYS

United States Patent Office 3,706,071
Patented Dec. 12, 1972

3,706,071

BINARY IMAGE PROCESSOR

Stephen B. Gray, Pacific Palisades, Calif., assignor to Information International, Inc., Los Angeles, Calif.

Filed June 22, 1970, Ser. No. 48,124
Int. Cl. G06k 9/12
U.S. Cl. 340—146.3 Q 7 Claims

ABSTRACT OF THE DISCLOSURE

In the image processor disclosed herein, unknown images are correlated with known images, both images being represented by arrays of binary data adapted to be arranged along first and second axes so as to form a matrix corresponding to the respective image. The processor operates in conjunction with a general purpose digital computer and random access memory which provide the processor with the image data arrays and certain operating parameters. According to one aspect of the invention, the unknown image is scanned in blocks comprising a plurality of bits and respective correlation function are generated so that the effect of shifting of the unknown image or correlation values may be readily determined. In another aspect of the invention, the unknown image is modified or treated to develop a result image and various characteristics of the result image are measured and counted. This latter process may, under program control, provide a result image which is an improved, i.e. more easily recognized, version of the original unknown image. Alternatively, this process may be utilized to provide information useful in analyzing and characterizing an unknown image.

BACKGROUND OF THE INVENTION

This invention relates to binary image processing apparatus and more particularly to such apparatus which is useful in optical character reading.

In typical optical character reading systems developed heretofore, the characters which may be read are usually quite closely restricted with regard to the variety of type fonts which can be read and, in spite of this restriction, the error or rejection rate is relatively high. These related disadvantages of restricted font and high rejection rate are due primarily to the inflexibility of the character recognition systems. In typical prior art practice, an unknown image is compared only with fixed masks. While the masks may be formed by electronic components, e.g. hard wired diode matrices, there is typically no provision for modification of either the mask against which the unknown character is correlated or the unknown image itself.

Among the several objects of the present invention may be noted the provision of image processing apparatus which permits a flexible comparison or correlation of unknown images with a wide variety of masks; the provision of such apparatus which utilizes masks or known images which are not fixed or hard-wired; the provision of such apparatus in which unknown images to be analyzed may be modified to facilitate their identification; the provision of such apparatus which provides data facilitating the correlation of unknown images with known or mask images; the provision of such apparatus which generates data facilitating analysis of a given unknown image under control of a computer program; the provision of such apparatus which operates rapidly; and the provision of such apparatus which is relatively simple and inexpensive. Other objects and features will be in part apparent and in part pointed out hereinafter.

SUMMARY OF THE INVENTION

As contrasted with the typical prior art optical character recognition schemes described previously, e.g. utilizing fixed or hard-wired masks, the image processing apparatus of the present invention is adapted to analyze unknown images in relation to known images, both of which are represented by respective arrays of stored binary data. The data is adapted to be arranged along first and second axes corresponding to a scanning matrix although, as will be understood by those skilled in the art, this data may actually be manipulated and stored in other formats. Both the unknown and known images may be stored in and obtained from the random access core memory of a general purpose computer.

The processor includes a series of at least three unknown image data registers for holding portions of the unknown data corresponding to successive lines spaced along the first of the previously mentioned data array axes. The registers include means for scanning, in successive blocks along the second axis, the data held in the registers. The blocks are of at least three bits extent on each of the axis, with each successive block scan being shifted from the preceding block by one bit so that there is a substantial overlapping of blocks. In one aspect of the invention, the apparatus includes a known image data register for holding known or mask data, corresponding in location within the respective image to one of the held lines of unknown data, the known data register being similarly scannable. The apparatus also includes means for generating a plurality of correlation signals, one for each bit position within a scanned block of unknown data. Each correlation signal is a preselectable logic function of the respective bit of the unknown data in the scanned block and a single bit of the known image data corresponding to the particular block position. A counter is driven by each of the correlation signals and thus the counts, accumulated by the counters as an array of unknown data is scanned, provide indications of the degree of similarity between the known and unknown images for various shifted positions.

In another aspect of the invention, the various bits in the block of unknown data are combined with each other other and, in certain instances, with various control parameter bits and known image bits according to preselectable logic functions so as to obtain a result image signal and each result bit thereby obtained is entered into a result image data register at a location corresponding to the location of the scanned block within the unknown data. By storing in memory successively generated lines of result data, there is built up, in the memory, an array of data representing a result image which is a preselected logical modification of the unknown image.

The apparatus may also comprise a second result image data register for holding a previously generated line of result data. The data in the two result data registers is then scanned in blocks of at least two bits extent along each axis. Means are provided for generating a plurality of result image characteristic signals, each of which indicates the presence of a respective class of data pattern in the scanned block of result data. Respective counters driven by each of the result image characteristic signals provide accumulated counts which provide an indication of the character of the result image as it is generated and thus also of the unknown image in relation to the known or mask image.

BRIEF DESCRIPTION OF THE DRAWINGS

Corresponding reference characters indicate corresponding parts throughout the several views of the drawings.

DESCRIPTION OF THE PREFERRED EMBODIMENT

The binary image processor described herein, is adapted to be controlled by a general purpose, i.e. stored program, digital computer which manages or oversees the overall optical character reading process. In other words, the image processor of this invention is arranged as a piece of so-called peripheral equipment for such a computer.

Figure 1:
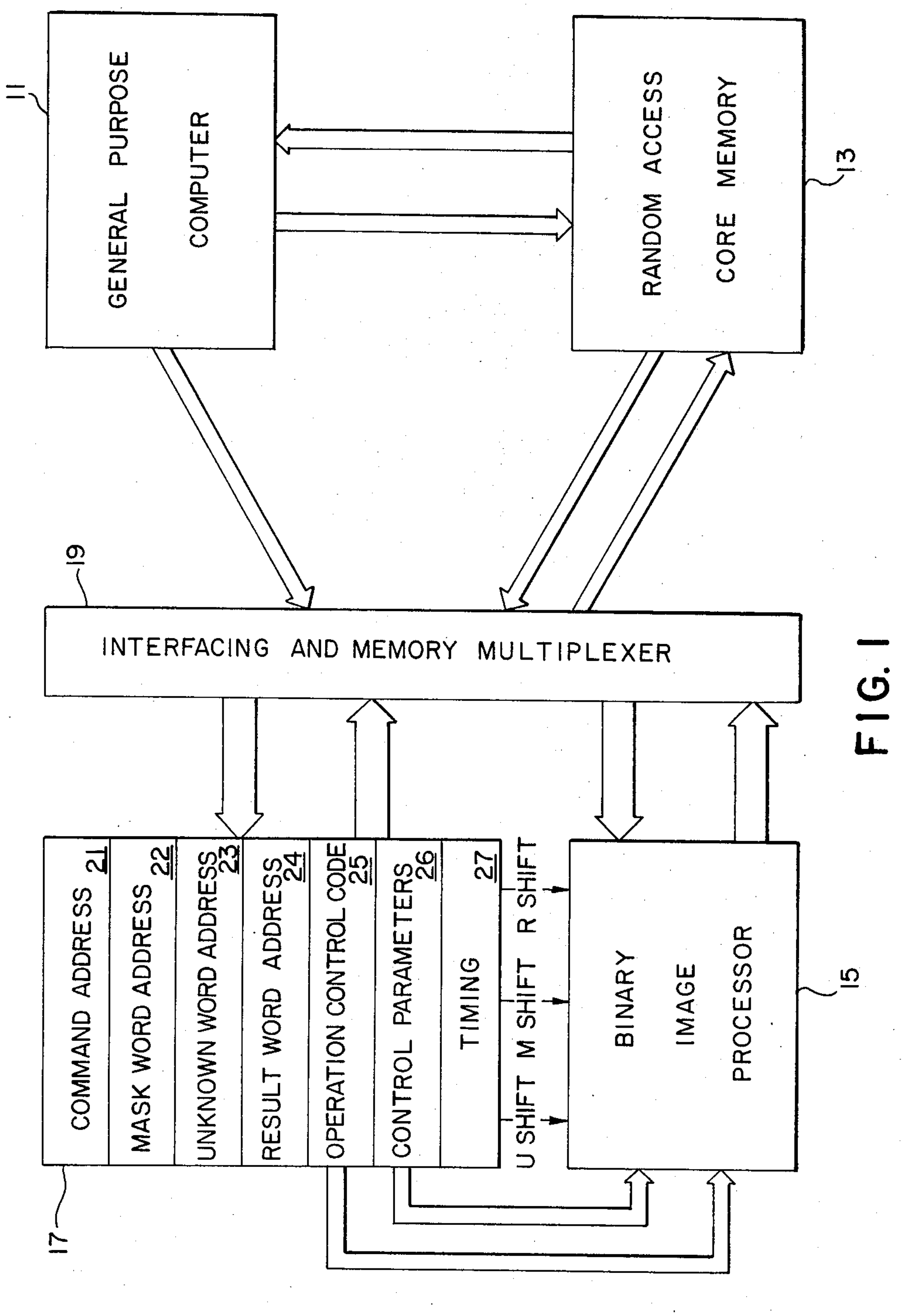
FIG. 1 is a block diagram of an image analysis system employing a binary image processor of the present invention.

Referring now to FIG. 1, there is indicated at 11 a general purpose or stored program computer. For handling optical character reading programs of the type utilized with the apparatus of the present invention, a computer of the so-called intermediate size category is appropriate, e.g. the PDP–10 Computer manufactured and sold by the Digital Equipment Corporation of Maynard, Mass. In FIG. 1, the core memory associated with such a computer is indicated separately at 13. As is understood by those skilled in the art, the normal operation of a computer such as indicated at 11 involves the exchange of data and instructions between the computer 11 and its core memory 13.

The binary image processor of the present invention is indicated at 15 in FIG. 1. Preferably, the image processor 15 is provided with its own supervisory or sequencing circuitry, as indicated at 17 so that the image processor can perform at least a limited sequence of operations independently of the main computer or processor 11. For this purpose, the image processor and its control circuitry 17 are preferably also provided with conventional interface and memory multiplexing circuitry, as indicated at 19, so that the image processor can exchange data and/or instructions directly with the memory 13. For convenience in describing the operation of the system, those "instructions" which are obtained by the processor 15 itself directly from memory are preferred to as "commands," leaving the term "instruction" for use solely as indicating an instruction in the program of the computer 11.

The control circuitry 17 for the binary image processor 15 preferably includes at least the following: a command counter 21 which is used in defining a sequence of addresses in the memory 13 from which the processor obtains sequential commands; a mask word address register 22 which serves as a storage element designating addresses in the memory 13 from which the processor obtains data representing certain known or mask images as described hereinafter; an unknown word address register 23 which is employed to designate an address in the core memory 13 from which the binary image processor 15 obtains data representing unknown images which are to be analyzed or identified; a result word address register 24 which designates core memory addresses in which the binary information processor may store data representing images which are generated as a part of the operation of the processor 15.

The control circuitry 17 also includes an operation control code register 25 which defines the state of the binary image processor 15 for each operation and a group of parameter registers 26. The data stored in the register 25 is, in fact, the command for the binary image processor which is obtained from core memory 13 at the last address designated by the counter 21. The control circuitry 17 also includes certain timing or clock circuits 27 which operate in response to various bits of the operation control code, to time or sequence various operations of the image processor itself, as is explained hereinafter.

While the present invention is concerned with the binary image processor 15 itself, a brief explanation of the overall mode of operation of the peripheral apparatus in cooperation with the computer 11 and memory 13 may aid in understanding the purpose and functioning of the processor itself. Assuming that the core memory has been appropriately loaded with sequences of commands for the image processor, arrays of data with which the processor is to work and the appropriate operating parameters, the computer 11 can initiate operation of the processor by setting the command counter 21 to the memory address of the first command to be executed. The control circuitry 17 associated with the image processor then loads the command from the memory into the operation control code. Typically, the first command will cause the control apparatus itself to load the various parameter registers and the mask word address, unknown word address and result word address registers. As is conventional in the operation of peripheral equipment, the completion of one command causes the command counter to be incremented so that a subsequent command in a sequential series stored in memory 13 is loaded into the operation control code register 25. Subsequent commands cause mask and unknown word data to be loaded from the memory into the processor 15, the locations of the data obtained being designated by the registers 22 and 23 and also cause this data to be processed. Likewise, result data generated by the processor and various measured parameters are read back into memory from the processor 15. As is also conventional, the last command in a sequence of commands may cause the control circuitry 17 to flag or interrupt the computer 11, so that further operation of the processor may be reinitiated under computer program control.

The binary image processor of this invention operates with images which are in the form of arrays of binary data stored in the core memory 13. A portion of this data will represent unknown images which are to be analyzed or identified. Such images may, for example, be obtained from a document or microfilm reader or scanner operating in real time and also being controlled by the computer 11 on a time-shared basis. Alternately, the unknown image data may be introduced into the memory 13 through the intermediary of magnetic tape or disk or other temporary data storage medium. In general, the following description assumes that image points or elements are represented by a binary "one" or "true," while the background is represented by a "zero." It will, however, be recognized that a complementary organization is equivalent and the claims should be accordingly construed. Either the binary "one" or the binary "zero" can be considered to be a predetermined binary state.

Another portion of the stored data represents known images. Some of these known images may be considered to be masks against which the unknown images are to be compared and correlated, while other of the known images may be special purpose designs or mosaics useful in the analysis of unknown images under the control of an optical character reading or image analysis program being performed by the computer 11. As noted previously, a portion of the core memory 13 will also be used for storing sequential commands or operation control codes which are to be executed by the binary image processor 15 and various parameters which are used by the processor.

Figure 2:
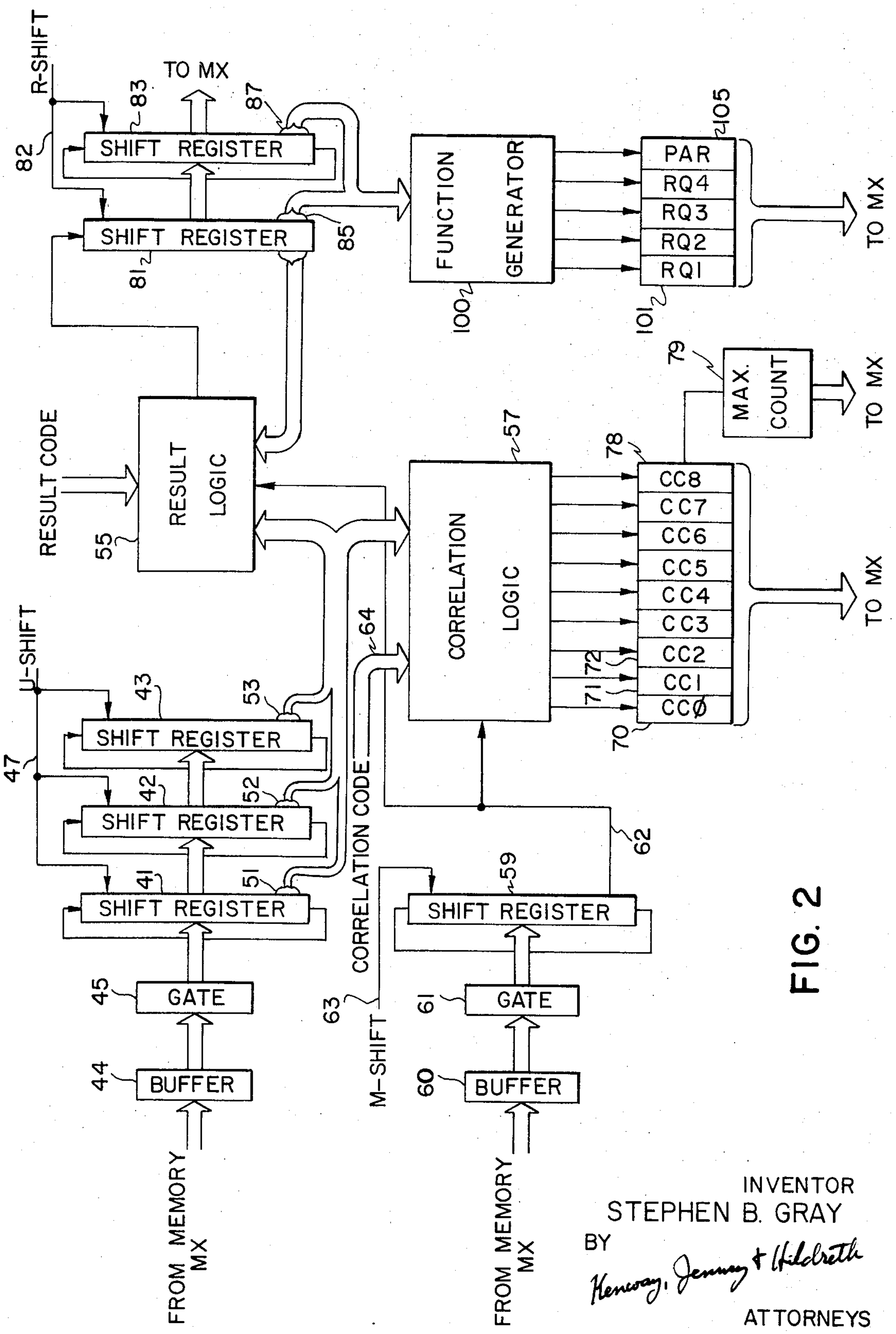
FIG. 2 is a block diagram of the image processor.

The organization and operation of the binary image processor 15 itself are explained with reference to FIG. 2. The image processor includes a series of at least three shift registers 41, 42 and 43 which are used for holding and manipulating portions of the data representing unknown images. Registers 41–43 may, for example, be in the order of 32 bits long. The first shift register 41 is adapted to be loaded from the core memory 13 through a buffer 44 and gating circuitry as indicated at 45. Each of the other registers, 42 and 43 is adapted to be loaded with data from the previous register in the series, synchronously with the transfer of data to the first register 41 from the buffer 44. For reasons which will be more apparent hereinafter, the unknown image data held by the register 42 is designated the present unknown image word, while the registers 41 and 43 hold the next and the previous unknown image words, respectively.

The lines or words of binary data held in the registers 41–43 may be shifted, within the respective register, in conventional synchronous manner under the control of a U-bit shift signal applied through a lead 47. Each of the registers 41–43 is connected, as indicated, so that the spillover of data from the downstream end of the register is reintroduced into the same register at its upstream end. Thus, the binary data or word in each register is, in effect, circulated by repetitive shifting so that, after a number of shifts equal to the length of the register, the stored word is back where it started. The registers 41–43 also include means for reading out the last three bits in each register, as indicated at 51–53, so that a 3-bit by 3-bit block of data is available for sampling. In FIG. 2 and elsewhere, the flow of data which comprises a plurality of parallel or simultaneous binary signals is represented by a broad arrow, while single bit signals or conductors are indicated by a single line. As an alternative to the parallel shifting of data between registers described above, the spillover from each of the first two could be introduced into the upstream end of the next register.

As the binary words held in the three registers 41–43 are circulated, the stored data is, in effect, scanned in a succession of blocks along one of the axes described previously. For convenience in description of the operation of this apparatus, this axis is hereinafter referred to as the bit axis. The other of the two axes is referred to as the word axis. As will be understood by those skilled in the art, the image may be scanned along the second or word axis, following the complete scanning of each word along the bit axis, by shifting binary words from each register in the series to a subsequent register, the binary data in the last register (43) being lost with the first register (41) being filled from the memory through buffer 44. The 3-bit by 3-bit data sample is applied to both result logic circuitry 55, described in greater detail hereinafter, and a correlation logic matrix 57. For convenience in subsequent description and in defining various signals generated in the processor, the central bit in the 3 x 3 block of sampled data is designated the U8 bit and its eight neighbors are designated Uϕ–U7 according to the orientation represented in FIG. 3.

While the embodiment illustrated uses shift registers to obtain the scanning function, it will be understood that other type of registers may be used and the data held therein can be sampled at different locations within the registers, e.g. by a suitable multiplexing system, rather than being scanned through the registers with the data being read out at fixed points.

The processor also includes a fourth shift register 59 which is used for holding one line or word of data representing a known or mask image. Register 59 can be selectively loaded from the computer core memory 13 through a buffer register 60 and gate ciricuitry as indicated at 61. The data in register 59 can be shifted bit by bit by means of a signal applied through a lead as indicated at 63 and the register is connected so that spillover from the downstream end of the register is fed back into the upstream end of the register. This arrangement provides for circulation of the held mask image data in the same manner as the unknown image data held in registers 41–43. However, since this data is not typically used more than once, an alternative is to just dump the spillover data. The last bit in the shift register 59 is read out as indicated at 62 and is applied to the logic matrices

55 and 57, as indicated. Thus, the the known image data in register 59 is circulated, it is in effect scanned bit by bit. The sample bit from the known image data is designated M.

Assuming that the known image data in register 59 is circulated synchronously with the circulation of the unknown image data in the registers 41, 42 and 43, each bit read out of the known image register 59 will generally correspond in location within the respective image to the location of the respective 3 x 3 block of sampled data within the unknown image.

As will be understood by those skilled in the art, it may be necessary, depending upon the respective image formats, to provide predetermined amounts of preshifting and postshifting of the arrays of image data on each of the two axes in order to provide the desired predetermined registration between the known and unknown images. However, as such requirements will depend upon the particular construction and logic systems used and are not central to the explanation of the present invention, these variations are not explained in detail. In general, since the unknown image is examined or scanned in blocks which encompass three binary words or lines of the image data, while the known is scanned bit by bit within each word, it will be desired to preshift the unknown image data on the word axis so that the current unknown image word held in register 42 corresponds in location within the desired image format to the location of the single word in the known image. Likewise, it is typically desirable to preshift the unknown data along the bit axis so that the central bit of the 3 x 3 block of unknown data corresponds in location within the total image to the location of the particular sampled bit of the known image data. Preferably, this preshifting is controlled within the peripheral apparatus itself without interrupting the main computer, the desired preshift quantities being among the parameters held in the control registers 26. Similarly, since the unknown image is sampled in a 3 x 3 block while only a single bit is taken from the known or mask image, there is, in effect, a "border" of unknown image sample positions, around the overall image, for which there is no corresponding known image sample position. Typically, it is desired that these border bits in the U-neighborhood be arbitrarily set to a predetermined value, typically "zero," the "background" value.

The correlation logic matrix 57 operates to generate a correlation signal for each bit of the 3 x 3 sample taken from the unknown data held in the registers 41–43. Each correlation signal is a preselected logical combination or function of the respective unknown image bit and the single or common known image bit, the same combination logic function being used for all nine of the unknown data sample bits to generate the respective correlation signals. The particular logical function which is generated is controlled by a binary correlation code which is one of the control parameters stored in the registers 26. This correlation code comprises three control bits, designated CUM, CUN and CNM, which are applied to the correlation logic matrix as indicated at 64. The output signal (ΔCCi) for each of the nine positions in the 3 x 3 sample array, i.e. for $i=\phi$ through 8, can be expressed in Boolean algebra as follows:

$$\Delta CCi = CUM \cdot Ui \cdot M + CUN \cdot Ui \cdot \overline{M} + CNM \cdot \overline{Ui} \cdot M$$

It can thus be seen that the matrix 57 is essentially a completely general logic gate matrix so that, under the control of the correlation code, the matrix can form most useful Boolean combinations of each unknown image bit and the common known image bit.

The nine correlation signals provided by the matrix 55 drive respective counters 70–78, the counts accumulated by these counters being designated CCϕ–CC8 corresponding to the unknown sample bits Uϕ–U8. Thus, as the respective known and unknown images are scanned, i.e. along one axis by reading in successive lines of binary data to the registers 41–43 and 59 and along the other axis by synchronously shifting or circulating the data held in each of those registers, the counters 70–78 will accumulate counts representing the number of times the particular preselected logical function has generated a logic "one" or "true" signal for each bit position within the sample block. Correlation information is thus obtained which indicates the relationship of the unknown image to the known image, not only at the center position but also for each of eight shifted positions of the image. Furthermore, the basis on which this correlation is obtained may be flexibly varied under the control of the computer programmer by his choice of the correlation code. It will be understood that the most common type of correlation is that provided by the AND function so that $\Delta CCi = Ui \cdot M$.

Counters 70–78 are connected to the memory multiplexer 19 so that the counts accumulated can be read back to the memory 13 after an entire image has been scanned, the counter being then reset. The image processor 15 further includes a gate matrix 79 for determining and identifying which of the counters 70–78 has accumulated the largest count. This designation is also applied to the memory multiplexer for storage in memory and subsequent use in the optical character reading program so that the position providing the best correlation is readily identified.

As noted previously, the nine bits sampled from the registers 41–43 and the single known data bit obtained from the register 59 are also applied to the result logic circuitry 55. This circuitry is a logic matrix 55 which generates a single bit output signal representing a preselectable logical combination of various signals applied thereto, including the unknown and known image data samples, Uφ–U8 and M, respectively.

As the data arrays representing the known and unknown images are scanned, the result signal provided by the matrix 55 is applied bit by bit to a fifth shift register 81. In normal operation, the data held in register 81 is shifted in synchronism with the shifting of the lines of unknown and known data held in registers 41–43 and register 59, respectively, R-bit shift signal being applied to register 81 through a line 82. Thus, as each word or line of known and unknown data is scanned, a corresponding line of result image data is generated and stored in the register 81.

The data in register 81 can be selectively transferred to a second result data register 83 as indicated, the data in this second result data register being shifted in synchronism with that in the register 81. Thus, after a first result binary word has been generated and has been transferred from register 81 to register 83, a pair of result image data words will be available.

The binary word held in register 81 is provided to the memory multiplexer 19 as indicated. Thus, as each line of result data corresponding to a given line of unknown data is completed, a previous word of result image data is stored in memory 13 at a location determined by the contents of the result word address register 24. Thus, as an entire unknown image is scanned, a result image, related to the unknown image according to a preselected logical function, is built up and stored in memory.

As is described in greater detail hereinafter, the result image may be a modified or improved version of the original unknown image, depending upon the process used for generating the R-bit signal. While the result image typically will be of the same relative size as the original unknown image, it should be noted that the unknown image can be, in effect, expanded or contracted if the shifting of the unknown and result image data arrays proceeds asynchronously rather than synchronously on one or both axes. If the result image is scanned faster than the original unknown, the image is expanded, a given R-bit being stored in more than one R register location to provide the additional needed binary information.

Similarly, the image can be contracted by shifting the unknown image faster than the result image, the extra R-bits being lost rather than being stored.

Figure 4:
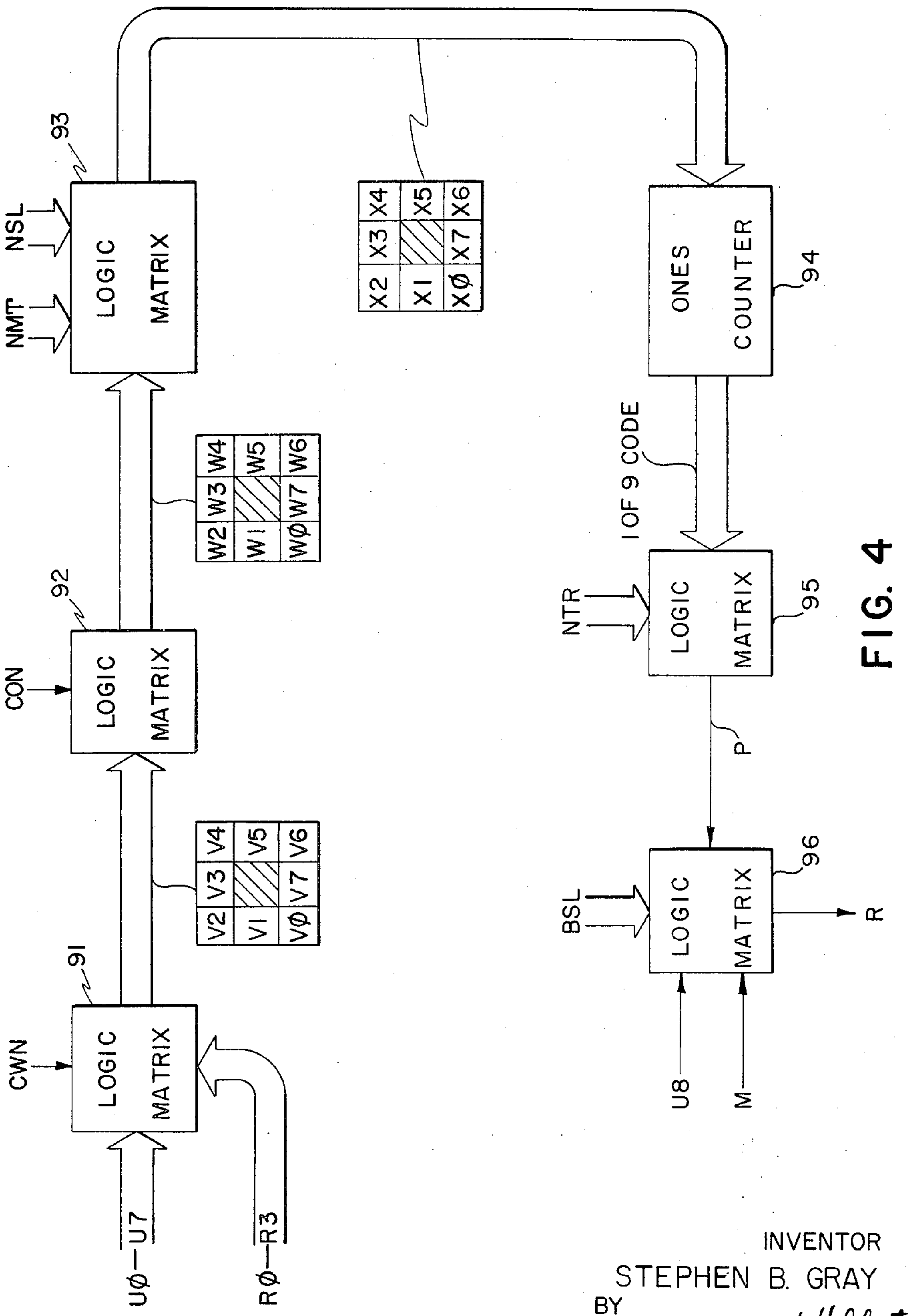
FIG. 4 is a diagram of a multi-stage logic matrix employed in the processor of FIG. 2.

As noted previously, the 3 x 3 block of data sampled from the unknown image data in registers 41, 42 and 43 can be considered to consist of a central bit U8 together with its eight neighbors Uφ–U7. For reasons which will be apparent hereinafter, the neighborhood bits Uφ–U7 are processed separately from the central bit U8 in generating the R-bit signal. With reference to FIG. 4, the processing of the eight neghborhood bits can conveniently be considered as the generation of successive sets of neighborhood signals, the functional transformation which generates each successive set being preselectable by means of a respective portion of the operation control parameters stored in registers 26. As the design of a particular logic matrix which will generate an output signal corresponding to defined logical combinations of given input signals is within the ordinary skill of one familiar with digital logic circuitry, the various logic matrices used in making these transformations are not illustrated in detail. Rather, these matrices are defined in terms of the logical combinations which they perform, expressed as Boolean functions.

Figure 3:
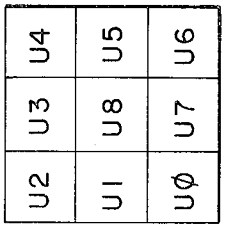
FIG. 3 is a diagram representing a 3 bit by 3 bit data sample block generated in the processor of FIG. 2.

Initially, the U-neighborhood (Uφ–U7) of FIG. 3 may be modified selectively by the substitution of the three corresponding bits from the previously generated result word, i.e. bits ROφ–RO2 in place of the three bits Uφ–U2 in the left hand column of the 3 x 3 array. This substitution is performed by a logic matrix 91 when a control bit designated CWN is present. For future reference, the array of eight signals so generated is designated the V-neighborhood and comprises individual signals designated Vφ–V7. These signals are defined in conventional Boolean form in accordance with Table 1 below. As may be seen, in the absence of the CWN operational control bit, the V-neighborhood is identical with the original U-neighborhood.

TABLE 1

$$V\phi = CWN \cdot R\phi + \overline{CWN} \cdot U\phi$$
$$V1 = CWN \cdot R1 + \overline{CWN} \cdot U1$$
$$V2 = CWN \cdot R2 + \overline{CWN} \cdot U2$$
$$V3 = U3$$
$$V4 = U4$$
$$V5 = U5$$
$$V6 = U6$$
$$V7 = U7$$

An array of eight signals, designated the W-neighborhood, is formed in the following manner. For each of the even V-neighborhood signals, Vφ, V2, V4, and V6, there is generated, in a logic matrix 92, a W-neighborhood signal which is either identical with the respective V-neighborhood signal or is a predetermined logical combination of the respective V-neighborhood signal with two of its neighbors. The selection is made by means of an operation control parameter bit, designated CON. These four W-neightborhood signals are defined in Table 2, as follows:

TABLE 2

$$W\phi = (V\phi + V7) \cdot \overline{V1} CON + \overline{CON} \cdot V\phi$$
$$W2 = (V2 + V1) \cdot \overline{V3} CON + \overline{CON} \cdot V2$$
$$W4 = (V4 + V3) \cdot \overline{V5} CON + \overline{CON} \cdot V4$$
$$W6 = (V6 + V5) \cdot \overline{V7} CON + \overline{CON} \cdot V6$$

Also, for each of the odd V-neighborhood signals, V1, V3, V5 and V7, there is generated a W-neighborhood signal which is either identical with the respective V-neighborhood signal or is a somewhat differently formed logical function of the respective V-neighborhood signal and two of its neighbors. The selection is again a function of the control parameter bit CON. These four signals are defined in Table 3 as follows:

TABLE 3

$$W1=(\overline{V7}+\overline{V0})\cdot V1\cdot CON+\overline{CON}\cdot V1$$
$$W3=(\overline{V1}+\overline{V2})\cdot V3\cdot CON+\overline{CON}\cdot V3$$
$$W5=(\overline{V3}+\overline{V4})\cdot V5\cdot CON+\overline{CON}\cdot V5$$
$$W7=(\overline{V5}+\overline{V6})\cdot V7\cdot CON+\overline{CON}\cdot V7$$

As will be developed in greater detail hereinafter, the particular logical functions which may be substituted for each V-neighborhood signal are related to the determination of the Euler number or connectivity of the overall image and the effect on this connectivity which may be exercised by the central bit (U8) of any given 3 x 3 neighborhood (Uϕ–U7) of the unknown image.

An array of eight signals, designated the X-neighborhood, is formed in a logic matrix 93 by the combination of the W-neighborhood signals with two 8-bit operational control parameters, designated NMT and NSL. The individual bits in each of these parameters correspond to respective ones of the neighborhood signals, i.e. the parameter NMT comprises eight individual bits NMT*i* for $i=0$ through 7. The X-neighborhood signals are generated according to the following Boolean relationship:

$$Xi=(Wi\cdot NSLi)\veebar NMTi$$

where the symbol $\veebar$ represents the exclusive OR function.

From this relationship, it can be seen that, by loading appropriate operation control parameters, each bit in the neighborhood can be either set to a desired or preselected value, independently of the corresponding W-neighborhood signal, or it can be a selected function of the respective W-neighborhood signal. For example, if the NMT bits are set in a particular selected pattern and if all the NSL bits are one, the number of ones present in the X-neighborhood array of signals will depend upon the extent or degree of coincidence between the W-neighborhood array and the preselected NMT bit pattern. Likewise, selected bit position can be effectively shut off, e.g. so that only the even W-neighborhood signals can produce a result bit in the X-neighborhood.

The number of ones present in the X-neighborhood is counted, as indicated at 94 in FIG. 4 and the count is read out in a one-out-of-nine code. In other words, nine output signals (Cϕ–C8) are provided and a "one" is generated on only that signal lead which corresponds to the value of the count, i.e. the number of ones present in the entire X-neighborhood array of signals. The remaining eight signals are "zeros." The nine signals provided by the counter 94 are combined in a logic matrix 95 with a 9-bit operational control parameter, designated NTR, according to the following Boolean function, to provide a signal designated the P-bit.

$$P=C\phi\cdot NTR\phi+C1\cdot NTR1+C2\cdot NTR2+\ .\ .\ .$$

where NTRϕ–NTR8 are the nine individual bits making up the parameter NTR.

Since the one-out-of-nine code represents the number of "ones" in the X-neighborhood, the 9-bit control parameter NTR can provide a thresholding operation on this number. By setting all of the NTR bits which correspond to values below the selected threshold to "zero" and setting the other NTR bits to "one," the P-bit will be a "one" only if the number of "ones" in the X-neighborhood is above the threshold. However, since the NTR parameter is combined with a set of signals which are in a one-out-of-nine code, the P-bit can also be caused to indicate whether the number of ones in the X-neighborhood is any one of a plurality of arbitrarily selected discrete values. As is explained hereinafter, this property is useful in making various connectivity determinations for image analysis and modification.

The P-bit is then combined with the sampled mask or known bit (M) and with the central bit of the unknown sample block (U8) in a logic matrix 96 to generate the R-bit according to the following Boolean expression:

$$\begin{aligned}R=&\overline{U}\,\overline{M}\,\overline{P}.BSL_0\\&+\overline{U}\,\overline{M}P.BSL_1\\&+\overline{U}M\overline{P}.BSL_2\\&+\overline{U}MP.BSL_3\\&+U\overline{M}\,\overline{P}.BSL_4\\&+U\overline{M}P.BSL_5\\&+UM\overline{P}.BSL_6\\&+UMP.BSL_7\end{aligned}$$

where BSLϕ–BSL7 are the individual bits of an eight bit operation control parameter, designated generally as BSL. Since BSL has $2^8$ possible states, all $2^{2^3}$ possible Boolean functions of U, M, and P can be generated. The R-bit is then applied to the shift register 81 as illustrated in FIG. 2.

The operational control quantities or parameters CON, CWN, NMT, NSL, NTR and BSL, 35-bits in all, together constitute the result logic code. As the construction of a logic array or matrix which would form the various signal combinations defined in Tables 1, 2, 3 and 4 and the P and R signals would depend upon the type of compatible electronic logic systems used, no particular detailed construction has been illustrated, as noted previously.

Figure 5:
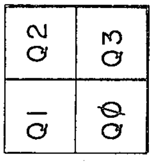
FIG. 5 is a diagram representing a 2 bit by 2 bit data sample block generated in the processor of FIG. 2.

In addition to generating and storing the result image, the image processor of the present invention also analyzes or measures certain characteristics of the result image, simultaneously with its creation. The last two bits in each of the registers 81 and 83 are read out, as indicated at 85 and 87 respectively, to obtain a 2-bit by 2-bit block of data. Thus, as the result image is generated, it is in effect scanned on a 2 by 2 block basis. This block of sample data is represented in FIG. 5 and comprises four bits Qϕ–Q3. The four bit block of sample data thereby obtained is applied to a logic matrix or function generator 100 which provides five output signals ΔRQ1, ΔRQ2, ΔRQ3, ΔRQ4 and ΔRAR which are generated from the four sample bits in accordance with the Boolean functions given in Table 4 below.

TABLE 4

$$\begin{aligned}\Delta RQ1=&\overline{Q}\phi\overline{Q}1\overline{Q}2Q3\\&+\overline{Q}\phi\overline{Q}1Q2\overline{Q}3\\&+\overline{Q}\phi Q1\overline{Q}2\overline{Q}3\\&+Q\phi\overline{Q}1\overline{Q}2\overline{Q}3\\&+Q\phi\overline{Q}1\overline{Q}2\overline{Q}3\end{aligned}$$

$$\begin{aligned}\Delta RQ2=&Q\phi Q1\overline{Q}2\overline{Q}3\\&+\overline{Q}\phi\overline{Q}1Q2Q3\\&+Q\phi\overline{Q}1\overline{Q}2Q3\\&+\overline{Q}\phi Q1Q2\overline{Q}3\end{aligned}$$

$$\begin{aligned}\Delta RQ3=&Q\phi Q1Q2\overline{Q}3\\&+Q\phi Q1\overline{Q}2Q3\\&+Q\phi\overline{Q}1Q2Q3\\&+\overline{Q}\phi Q1Q2Q3\end{aligned}$$

$$\Delta RQ4=Q\phi Q1Q2Q3$$

$$\Delta RAR=Q\phi$$

These signals are applied to respective counters 101–105 which count the number of times a "one" occurs in the respective signal, as an entire image is scanned. The generation of a "one" in one of the signals ΔRQ1, ΔRQ2, ΔRQ3 and ΔRQ4 indicates the occurrence of a respective type of data pattern in the 2 x 2 bit sample block. Thus, these counts accumulated by the counters 101–104 may be represented in a semi-graphical form as shown in Table 5 below.

TABLE 5

$$RQ1=n\binom{00}{01}+n\binom{01}{00}+n\binom{10}{00}+n\binom{00}{10}$$

$$RQ2=n\binom{00}{11}+n\binom{01}{01}+n\binom{11}{00}+n\binom{10}{10}$$

$$RQ3=n\binom{11}{10}+n\binom{10}{11}+n\binom{01}{00}+n\binom{11}{01}$$

$$RQ4=n\binom{11}{11}$$

From the foregoing, it may be seen that the count (RQ1) accumulated by the first counter (101) may be characterized as indicating the number of "outside" corners which occur in the result image; the count (RQ2) accumulated in the second counter (102) may be characterized as indicating the number of units of "side edge" to be found in the result image; the count (RQ3) accumulated in the third counter (103) may be characterized in indicating the number of "inside" corners occurring in the result image; and the count (RQ4) accumulated in the fourth counter (104) indicates the number of "solid blocks" occurring in the result image. The count (RAR) accumulated in the last counter (105) is merely the total number of "ones" or image points occurring in the entire result image.

The various counts accumulated in the counters 101–105 are provided to the memory multiplexer so that they can be stored in the memory 13 for later use in the performance of image analysis by the computer 11, as is explained in greater detail hereinafter. In addition to the more directly measured quantities RQ1, RQ2, RQ3, RQ4 and RAR, another quantity RQD may be defined which represents the number of "diagonal contacts," that is, $$RQD=n\binom{01}{10}+n\binom{10}{01}$$

This quantity may be found from the following relationship.

$$RAR=\frac{RQ1}{4}+\frac{RQ2}{2}+\frac{RQD}{2}+\frac{3RQ3}{4}$$

The description thus far relates mainly to the design and construction of apparatus according to the present invention and operation has been discussed essentially only in relation to the functioning of individual components or elements of the apparatus, e.g. the shift registers, the logic gate matrices providing signal generation, and the like. While it will be apparent to those skilled in the fields of topology, optical character reading, and image analysis that the information provided by the disclosed apparatus is useful in identifying, manipulating, and analyzing images presented to it in binary form, the following examples of image processes which may be performed using this apparatus will further serve to illustrate the usefulness of this apparatus and its preferred mode of operation.

One of the simpler but more useful functions of the illustrated apparatus is to identify unknown images in relation to known images or masks. The known images may be stored in memory so as to constitute a reference file. The comparison of unknown and known images proceeds in straightforward fashion when arrays of binary data representing individual characters, e.g. printed letters or numbers properly scanned and oriented, are stored in memory at respective discrete locations. An individual array of data representing an unknown image can then be scanned through the registers 41–43 in synchronism with the scanning of data representing a selected known image or mask through the register 59. The counters 70–78 will then be incremented to counts representing the degree of correlation between the known and unknown images for respective shifted or unshifted relative positions. A count above a preselected level can then be accepted as a match or a series of masks can be run and the best correlation count obtained can be accepted as indicating an acceptable match. As is understood, predictive analysis of a word or sentence under control of the computer program can be used to select which masks are tried first so as to reduce, on a statistical basis, the number of masks which need to be tried.

Since each bit of the data array representing the known image is compared not only with the central or main bit (U8) of the 3 x 3 sample block of unknown data, but also with each of its eight immediate neighbors (Uϕ–U7), the several correlations being obtained independently, a correlation count is obtained not only for the presumably aligned positions of the two images being compared, but also for eight laterally shifted positions. Thus, a check on registration is obtained and corrective measures can be applied as needed, e.g. either through the original scanning process which obtains the binary data representing the image, or by means of selective preshifting of the binary data along one or both of the two image axes.

As mentioned previously, the result image generated and stored during the scanning of an unknown image may be an image which is an improved version of the original unknown image. Thus, characteristics of the original unknown image can be determined by analyzing the result image. If desired, the result image can in fact be made identical to the original unknown image by proper selection of the result code parameters.

The length of the perimeter of a given result image can be obtained in the following way. Since the RQ2 counter is incremented each time a 2 x 2 neighborhood is encountered which comprises two ones which are side by side in an array which contains no other ones, each unit in the RQ2 counter can be considered as contributing one unit of perimeter. The RQ1 counter is incremented each time a 2 x 2 neighborhood is encountered which contains only a single one. Since the single one is necessarily at a corner of the 2 x 2 array facing three zeros, the perimeter is necessarily turning a corner at this point. The effective contribution to the perimeter can conveniently be considered to be the diagonal across the single bit, i.e. $1/\sqrt{2}$ units of perimeter. Likewise, the type of 2 x 2 neighborhood which increments the RQ3 counter can likewise be considered to be at a corner of the image and thus each increment of count in this counter can likewise be considered as making $1/\sqrt{2}$ units of perimeter contribution to the total. The total length of the perimeter of an image (P) can therefore be determined by evaluating the quantity $$RQ2+\frac{RQ1+RQ3}{\sqrt{2}}$$

This determination can be made using the generalized computational abilities of the computer 11. Considering a given result image to be made up of lines as opposed to large masses of "ones" or image points, the average line length ($L_L$) may be taken as being half the perimeter length to a first approximation, i.e.

$$L_L=\frac{P}{2}$$

While the counter RQ1, RQ2, RQ3 and RQ4 indicate the frequency of occurrence of various patterns in the 2 x 2 block of data sampled from the result image, the count provided by the RAR counter is merely an indication of the total number of ones in the result image. Thus, this count can be considered as defining the overall weight or "mass" of the image. Having the average line length of an image as well as its "mass," the average line width can be then obtained to a first approximation by dividing the RAR count by the average line length. One way of evaluating an image to see if it is suitable for optical character reading purposes, i.e. for comparison with masks, is to evaluate the average line thickness. With a given set of masks, the average line thickness should lie between predictable limits to obtain satisfactory correlation results.

Another use of the quantities measured by counters 101–105 is in determining the relative number of bodies (B) and holes (H) in a given image. In making such an analysis, it is useful to contemplate tracing of the perimeter of each body in a clockwise direction, each body and hole being made up of square elements in the result image.

From the quasi-graphical definitions of the signals used to increment the counters 101–105 given in Table 5, it can be seen that the RQ1 counter will be incremented for each right hand turn made in tracing a perimeter clockwise and that the RQ3 counter will be incremented once for each left hand turn made in tracing the perimeter clockwise. By tracing the perimeter clockwise is meant that the interior of the perimeter on the right during the tracing. In a closed perimeter surrounding a single body it can be seen that the number of right hand turns will be four more than the number of left hand turns. In other words, for a single body's outer perimeter, $RQ1=RQ3+4$. Similarly, for the perimeter of a single hole $$RQ3=RQ1+4$$

While the counts provided by the counters 101–105 will not, by themselves, define either the absolute number of bodies or holes in an image, the quantity $B-H$ is defined as follows:

$$B-H=\frac{RQ1-RQ3}{4}$$

In general, it may be noted that one way of evaluating an image to see whether it is suitable for correlation with a series of masks for optical character reading purposes is to evaluate $B-H$. If the quantity $B-H$ lies between −2 and +3, it provides a reasonably acceptable verification that a good one-character image is represented by the data array. On the other hand, if this quantity lies outside these bounds, this information typically indicates that the image has been fragmented or that there are a number of extraneous spots ("noise") in the image and that the image should be further developed, refined, or modified to enhance the probability that it can be correctly identified.

Another measure which can indicate "noise" in the image is an usually high quantity for RQD. Since this quantity is a measure of "diagonal touchings" or "almost touching," it can be seen that a large number of small, closely adjacent fragments will cause this quantity to be relatively high. Similarly, in making an initial or trial scan of an image, a high value for this quantity indicates that the scan was a too low a resolution setting so that the scan could not adequately resolve the separations between image elements.

The unknown image is modified under the control of the result code which determines the generation of the R-bit signal which, in turn, forms the result image. One modification which can be applied to the unknown image affects the generation of the result image in such a way as to broaden portions of the image, i.e. to, in effect, "smear" the image. As noted previously, the X-neighborhood (FIG. 4) can be thresholded by the ones' counter 94 and the logic matrix 95 so that the P-bit is a "one" whenever the X-neighborhood contains more than a predetermined number of ones. By causing the X-neighborhood to be identical with the original unknown neighborhood, by setting a relatively low threshold, and by using the P-bit itself for the R-bit, a result image will be generated in which the image elements are in effect broadened or spread out. Thus, if an image is fragmented by small breaks, the broadening will cause these breaks to be closed in so that the number of bodies present is substantially reduced. The image elements can similarly be thinned or reduced by setting a relatively high threshold. However, as will appear hereinafter, another method of thinning image components or lines is also available and this other method is preferred in most instances.

In an optical character reading system operating in real time, that is, with the image scanning being performed essentially contemporaneously with the character recognition and analysis, the ability to smear an image is also useful in locating a page edge or a line within a page. During such an operation, the scanner is operated with a relatively large field so that it looks at an area much larger than a single page. By using the smearing technique just described, a line of characters may be made to appear as a solid bar even though the scanner itself is sharply focussed. In other words, the image processor itself can simulate an out-of-focus scan. Further, since the processor works at electronic speed, such a modification of the image can be accomplished faster using the processor than by correspondingly controlling the operation, e.g. focus, of the optical scanner.

Figure 6:
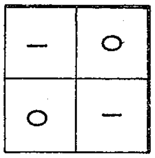
FIG. 6 is a diagram representing a particular form of 2 bit by 2 bit data sample.

As noted previously, the group of signals which constitute the W-neighborhood (FIG. 4) can be selectively modified under the control of the operational control bit CON so as to constitute functions which are useful in determining the effect which the central sample bit (U8) can have upon the connectivity or Euler number of the image as a whole. The connectivity of the image may be defined in either of two distinct ways, plus a third way which is a combination of the first two. Considering the 2 x 2 neighborhood illustrated in FIG. 6, which contains two "ones" touching only at a corner, the connectivity of the image containing this block can be defined in a first manner in which the two "ones" are considered to be connected. This is referred to as W-type Euler number or connectivity. If the "zeros" are considered to be connected, (so that the "ones" are considered to be not connected) the second type of connectivity is defined. This second type of connectivity is arbitrarily designated Z-type Euler number or connectivity. In either case, the Euler number or connectivity (E) is taken to be the quantity $B-H$ defined previously with reference to the result image characteristic counters 101–105. A suitable subscript is used to indicate which type of connectivity is meant, i.e. $E_W$ for W-type connectivity and $E_Z$ for Z-type connectivity.

The effect which any selected central sample bit (U8) may have upon the connectivity of an image is defined as $\Delta E$, i.e. the difference between the connectivity which exists if the central bit is a one ($E_1$) and the connectivity which exists if the central bit is a zero. ($E_0$) Expressed as a formula:

$$\Delta E=E_1-E_0$$

Further subscripts may be used in addition to indicate whether Z-type or W-type connectivity is referred to.

It can be shown mathematically that $\Delta E_Z$ and $\Delta E_W$ can have only certain discrete values, i.e. −3, −2, −1, 0 and +1. It may further be shown that the effect ($\Delta E$) which a given central bit (U8) may have upon the connectivity of an entire image may be determined from the 8-bit U-neighborhood (Uϕ–U7) alone, i.e. without looking at the central bit itself. This follows from considering that the central bit is a possible member of each of four 2 x 2 neighborhoods. In order to determine $\Delta E_W$ for a given U-neighborhood, the W-neighborhood is generated in the connectivity mode, i.e. the operation control parameter CON is set a "one" and the NMT and NSL parameters are selected so that only the even X-neighborhood positions (UO, U2, U4 and U6) are active, as described previously. It can then be mathematically shown that the count determined by the ones counter 94 is equal to $1-\Delta E_W$. Using the 9-bit control quantity NTR it is then possible to determine if the $\Delta E_W$ value so determined is one of a specific set of values or is any value other than zero. A P-bit can thus be generated accordingly. Thus, the formation of the result image is influenced by whether each particular central sample bit (U8) can effect the W-type connectivity of the image in a particular way.

If it is desired to determine the effect of the central bit on Z-type connectivity, the NMT and NSL parameters are selected so that only the odd X-neighborhood positions (X1, X3, X5 and X7) are active. It can then be shown that the count determined by the ones counter 94 is equal to $1-\Delta E_Z$.

As the P-bit can be controlled as a function of the effect which the central bit U8 can have upon the connectivity, and since each result bit can be influenced as any desired function of the P-bit, it can be seen that a result image can be generated which is similar to the original unknown image except that all bits which could not affect the connectivity of the overall image are dropped. As will be understood by those skilled in the field of topology, the dropping of bits which cannot affect the connectivity of the image will, in effect, thin the lines of a line image but will not break any lines since the dropping of any bit which would constitute a breaking of a line would change the Euler number. Thus, by repeatedly generating result images in this way and using each result image as the next unknown image, a line image can be gradually refined until each of the lines forming the image is only a single bit in width. The average line width can be computed, as described previously, to determine the general effect such treatment has on the image being processed.

The connectivity mode of operation is also useful in determining those points at which lines cross or meet. After a line image has been thinned so that all lines are essentially only a single bit in width, the point at which two lines cross can be readily identified because the bit at this point will have a $\Delta E_z$ equal to $-3$. If one line merely meets another, i.e. a T-shaped intersection, then $\Delta E$ will be $-2$. After a line image has been thinned down so that all lines are only one bit wide, the end points of lines can be readily identified since these are the only bits whose $\Delta E$ value is zero. As will be understood by those skilled in the topology and optical character reading arts, this information can be highly useful in defining, characterizing and analyzing unknown images. As will be understood, image points having a particular value of $\Delta E$ can be identified by selecting the NTR parameter so that only the ones count corresponding to the desired $\Delta E$ will cause a P-bit to be produced.

While the analysis and characterization of images may be useful for optical character reading purposes when mere correlation with masks is inadequate, it should be understood that these types of analysis are also useful in other fields. For example, in the analysis of engineering drawings for facsimile transmission without highly redundant scanning of redundant information, the determination of end points and crossing points of various line segments is highly useful in defining those line segments so that they can be recreated after transmission without a conventional high resolution scanning process.

The use of special purpose masks or known images for use in modifying or analyzing an unknown image was mentioned briefly earlier in the specification. One particularly useful special-purpose mask is one having a density which is graded along one or the other of the two axes, i.e. a mask which has a very thin scattering of "ones" along one edge and a very dense distribution of "ones" along the other edge with a linear gradation of density therebetween. If such a mask image is correlated with the unknown image, a correlation count is generated, e.g. in the counter 78 which counts the correlation of the mask bit with the U8 bit, which may be considered to be the "weighted" mass of the image. In other words, the contribution of portions of the unknown image which are on the dense side of the mask image will be relatively greater than the contribution of those portions of the unknown image which are on the light or thin side of the mask image. Accordingly, by dividing the weighted mass by the mass of the original unknown image, a value is obtained which is, in effect, the fractional distance of the center of gravity along the axis of mask gradation.

For example, if the mask is considered to be graded from left to right and the weighted mass divided by unweighted mass is .6, this means that the center of gravity of the image is located 3/5 of the way from left to right across the entire image width. The center of gravity along the other axis can be determined in similar manner. The obtaining of the center of gravity is one more bit of information about the unknown image which may be used in identifying or analyzing it when the unknown image is of such a character that it cannot be merely correlated against predetermined known masks. Further, this information may be useful in establishing initial registration between unknown images and masks.

The correlation counters 70–78 can also be used to correlate the unknown image with itself in each of eight shifted positions. If the U8 bit is used in place of the M bit, which may be provided for by an appropriate operating parameter selection, each of the neighborhood counters 71–77 will accumulate a count which represents the correlation of the unknown image with itself for a correspondingly shifted position, i.e. $\Delta CCi = U8 \cdot Ui$. The last counter (CC8) will accumulate a count equal to the mass of the image, i.e. the total number of "ones" in the entire image, since it correlates the unknown image with itself. If the image is made up of mainly vertical lines, the counts corresponding to the vertically displaced positions will be only slightly different from the mass value while the counts corresponding to the horizontally displaced positions will be widely different from this value. Thus, these counters can provide information which enables the program to determine if the image is more horizontal lines than vertical lines and vice versa. In the simple case in which the image is all "ones" on one side of a diagonal line and all zeros on the other side, the correlation counters can provide information defining the angle of the line ($\phi$) according to the following relationship.

$$\tan \phi = \frac{CC8 - [CC1 + CC5]}{CC3 + CC7}$$

This situation may exist when the edge of a page is being scanned and it is desired to determine the orientation of the page so that the scan can be corrected to give the desired horizontal scanning axis.

While the various operations of image transformation and modification and of correlation and analysis could be performed by the general purpose computer 11 itself, the program required to develop the same quantity of data would require many iterative loops. Thus, the overall operation would be quite slow as compared with the operation of the present apparatus which, by simultaneously developing various correlation and result image character counts and generating a refined or modified result image, operates relatively quickly. Thus, using of the apparatus of the present invention it is possible to process image data at a rate which makes the use of memory stored masks feasible and which makes it possible to operate an optical character recognition system in real time.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. In apparatus for analyzing unknown images in relation to known images, said unknown and known images being represented by respective arrays of binary data adapted to be arranged along first and second axes; an image processor comprising:

a series of at least three unknown image data registers for holding portions of said unknown data corresponding to successive lines spaced along said first axis, said registers including means for scanning, in successive blocks along said second axis, the data held in said registers, the blocks being of at least three bits extent on each of said axes with each successive block along said second axis being shifted from the preceding block by one bit;

a known image data register for holding known data corresponding in location within the respective images to one of the held lines of unknown data, said known data register including means for scanning the held data bit by bit along said second axis in synchronism with the block scanning of said unknown data registers;

means for entering successive lines of known and unknown data into said known data register and one of said unknown data registers respectively and for entering into each of the other unknown data registers data from a preceding unknown data register in said series, thereby to scan the arrays of data along said first axis;

means for generating a plurality of correlation signals, one for each bit position within a scanned block of said unknown data, each such correlation signal being a preselectable logical function of the respective bit of the unknown data in the scanned block and the single bit of known image data corresponding to the scanned block position;

a respective counter driven by each of said correlation signals; and means for reading out data from said counters, whereby the counts, accumulated by said counters as an array of unknown data is scanned, provide indications of the degree of similarity between the known and unknown images.

2. In apparatus for analyzing unknown images in relation to known images, said unknown and known images being represented by respective arrays of binary data adapted to be arranged along first and second axes; an image processor comprising:

a series of at least three unknown image data registers for holding portions of said unknown data corresponding to successive lines spaced along said first axis, said registers including means for scanning, in successive blocks along said second axis, the data held in said registers, the blocks being of at least three bits extent on each of said axes with each successive block along said second axis being shifted from the preceding block by one bit, there being nine bits in each block with U8 being the central bit, Uϕ being a corner bit and U1–U7 being sequential bits surrounding the central bit;

a known image data register for holding known data corresponding in location within the respective images to one of the held lines of unknown data, said known data register including means for scanning the held data bit by bit along said second axis in synchronism with the block scanning of said unknown data registers, the scanned bit of known image data being designated M;

means for entering successive lines of known and unknown data into said known data register and one of said unknown data registers respectively and for entering into each of the other unknown data registers data from a preceding unknown data register in said series, thereby to scan the arrays of data along said first axis;

a logic matrix for generating from the block of scanned data, a plurality of correlation signals, ΔCCϕ–ΔCC8, one for each bit position within the scanned block of said unknown data corresponding to the Boolean expression $\Delta CCi = Ui \cdot M$ for $i = \phi$ to 8;

a respective counter driven by each of said correlation signals; and means for reading out data from said counters, whereby the counts, accumulated by said counters as an array of unknown data is scanned, provide indications of the degree of similarity between the known and unknown images.

3. In apparatus for analyzing unknown images represented by arrays of binary data which are stored in a memory and are adapted to be arranged along first and second axes, an image processor comprising:

a series of at least three unknown image data registers for holding portions of said unknown data corresponding to successive lines spaced along said first axis, said registers including means for scanning, in successive blocks along said second axis, the data held in said registers, the blocks being of at least three bits extent on each of said axes with each successive block along said second axis being shifted from the preceding block by one bit;

a result image data register;

a known image data register for holding known data corresponding in location within the respective images to one of the held lines of unknown data, said known data register including means for scanning the held data bit by bit along said second axis in synchronism with the block scanning of said unknown data registers;

means for combining the bits comprising each scanned block of unknown data and the corresponding bit of known data according to a preselectable logic function and entering the result bit so generated into said result image data register at a location corresponding to the location of the scanned block within the unknown data;

means for entering successive lines of unknown data into a first of said unknown data registers from said memory and for entering into each of the other unknown data registers data from a preceding unknown data register in said series, thereby to scan the arrays of data along said first axis; and means for storing in said memory successively generated lines of result data from said result data register thereby to generate in said memory an array of data representing a result image which is a preselected logical modification of said unknown image.

4. Apparatus as set forth in claim 3 wherein said result bit is generated when the number of bits in the respective scanned block which are in a predetermined binary state exceeds a preselectable level.

5. In apparatus for analyzing an image represented by an array of binary data adapted to be arranged along first and second axes; an image processor comprising:

a set of at least two image data registers;

means for successively entering into one of said registers a portion of said data corresponding to successive lines of data spaced along said first axis;

means for transferring data from said one data register to the other data register synchronously with the entering of data into said one data register, said data registers including means for scanning the data held therein along said second axis in blocks of at least two bits extent on each of said axes, the bit being designated Qϕ–Q4 where Qϕ and Q2 are diagonally disposed within the block;

means for generating a plurality of image characteristic signals (ΔRQ1, ΔRQ2, ΔRQ3, ΔRQ4 and ΔRAR) defined by the following Boolean expressions:

$$\Delta RQ1 = \overline{Q\phi Q1 Q2}Q3 + \overline{Q\phi Q1}Q2\overline{Q3} + \overline{Q\phi}Q1\overline{Q2Q3} + Q\phi\overline{Q1Q2Q3}$$

$$\Delta RQ2 = Q\phi Q1\overline{Q2Q3} + \overline{Q\phi Q1}Q2Q3 + Q\phi\overline{Q1Q2}Q3 + \overline{Q\phi}Q1Q2\overline{Q3}$$

$$\Delta RQ3 = Q\phi Q1 Q2\overline{Q3} + Q\phi Q1\overline{Q2}Q3 + Q\phi\overline{Q1}Q2Q3 + \overline{Q\phi}Q1Q2Q3$$

$$\Delta RQ4 = Q\phi Q1 Q2 Q3$$

$$\Delta RAR = Q\phi$$

a respective counter driven by each of said image characteristic signals, whereby the count accumulated by each of said counters as an array of data is scanned provides an indication of the frequency of occurrence of a respective class of data pattern in the scanned block of data.

6. In apparatus for analyzing unknown images in relation to known images, said unknown and known images being represented by respective arrays of binary data adapted to be arranged along first and second axes; an image processor comprising:

- a series of at least three unknown image data registers for holding portions of said unknown data corresponding to successive lines spaced along said first axis, said registers including means for scanning, in successive blocks along said second axis, the data held in said registers, the blocks being of at least three bits extent on each of said axes with each successive block along said second axis being shifted from the preceding block by one bit;
- a known image data register for holding known data corresponding in location within the respective images to one of the held lines of unknown data, said known data register including means for scanning the held data bit by bit along said second axis in synchronism with the block scanning of said unknown data registers;
- a set of at least two result image data registers;
- means for combining the bits comprising each scanned block of unknown data and the corresponding bit of known data according to a preselectable logic function and entering the result bit so generated into a first one of said result image data registers at a location corresponding to the location of the scanned block within the unknown data;
- means for entering successive lines of known and unknown data into said known data register and one of said unknown data registers respectively and for entering into each of the other unknown data registers data from a preceding unknown data register in said series, thereby to scan the arrays of data along said first axis;
- means for transferring data from said first result image data register to said second result image data register synchronously with the transfer of data between said unknown image data registers, said result data registers including means for scanning the data held therein along said second axis synchronously with the scanning of unknown data in said series of registers, said result data being scanned in blocks of at least two bits extent on each of said axes;
- means for generating a plurality of result image characteristic signals each of which indicates the presence of a respective class of data pattern in the scanned block of result data; and a respective counter driven by each of said result image characteristic signals, whereby the counts accumulated by said counters as an array of unknown data is scanned provide an indication of the character of the unknown image.

7. In apparatus for analyzing unknown images in relation to known images, said unknown and known images being represented by respective arrays of binary data adapted to be arranged along first and second axes; an image processor comprising:

- a series of at least three unknown image data registers for holding portions of said unknown data corresponding to successive lines spaced along said first axis, said registers including means for scanning, in successive blocks along said second axis, the data held in said registers, the blocks being of at least three bits extent on each of said axes with each successive block along said second axis being shifted from the preceding block by one bit;
- a known image data register for holding known data corresponding in location within the respective images to one of the held lines of unknown data, said known data register including means for scanning the held data bit by bit along said second axis in synchronism with the block scanning of said unknown data registers;
- a set of at least two result image data registers;
- means for combining the bits comprising each scanned block of unknown data and the corresponding bit of known data according to a preselectable logic function and entering the result bit so generated into a first one of said result image data registers at a location corresponding to the location of the scanned block within the unknown data;
- means for entering successive lines of known and unknown data into said known data register and one of said unknown data registers respectively and for entering into each of the other unknown data registers data from a preceding unknown data register in said series, thereby to scan the arrays of data along said first axis;
- means for transferring data from said first result image data register to said second result image data register synchronously with the transfer of data between said unknown image data registers, said result data registers including means for scanning the data held therein along said second axis synchronously with the scanning of unknown data in said series of registers, said result data being scanned in blocks of at least two bits extent on each of said axes;
- means for generating a plurality of correlation signals, one for each bit position within a scanned block of said unknown data, each such correlation signal being a preselectable logical function of the respective bit of the unknown data in the scanned block and the single common bit of known image data corresponding to the scanned block position;
- a respective correlation counter driven by each of said correlation signals;
- means for generating a plurality of result image characteristic signals each of which indicates the presence of a respective class of data pattern in the scanned block of result data;
- a respective result characteristic counter driven by each of said result image characteristic signals; and
- means for reading out data from said counters, whereby the counts accumulated by said correlation counters as an array of unknown data is scanned provide indications of the degree of similarity between the known and unknown images and the counts accumulated by said result characteristic counters provide an indication of the character of the unknown image.

References Cited

UNITED STATES PATENTS

| | | | |
|---|---|---|---|
| 3,152,318 | 10/1964 | Swift, Jr. | 340—146.3 Q |
| 3,234,513 | 2/1966 | Brust | 340—146.3 |
| 3,196,398 | 7/1965 | Baskin | 340—146.3 H |
| 3,178,688 | 4/1965 | Hill et al. | 340—146.3 AC |
| 3,522,586 | 8/1970 | Kiji et al. | 340—146.3 MO |
| 3,541,511 | 11/1970 | Genchi et al. | 340—146.3 AC |

OTHER REFERENCES

Stockdale, IBM Tech. Disclosure Bulletin, "Image Matching Character Recognition System," vol. 8, No. 5, October 1965, pp. 761–763.

MAYNARD R. WILBUR, Primary Examiner

L. H. BOUDREAU, Assistant Examiner

U.S. Cl. X.R.

235—181; 340—146.3 MA